United States Patent
Marathe et al.

(10) Patent No.: US 10,323,555 B2
(45) Date of Patent: Jun. 18, 2019

(54) AFTERTREATMENT REGENERATION WITH VARIABLE TIME AND TEMPERATURE

(71) Applicant: Cummins Inc., Columbus, IN (US)

(72) Inventors: Salil H. Marathe, Indianapolis, IN (US); Pourash G. Patel, Columbus, IN (US); James A. Cramer, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 16/130,452

(22) Filed: Sep. 13, 2018

(65) Prior Publication Data

US 2019/0010845 A1 Jan. 10, 2019

Related U.S. Application Data

(63) Continuation of application No. 15/299,999, filed on Oct. 21, 2016, now Pat. No. 10,077,695.

(Continued)

(51) Int. Cl.
*F01N 3/023* (2006.01)
*F01N 3/20* (2006.01)
*F01N 9/00* (2006.01)

(52) U.S. Cl.
CPC .............. *F01N 3/20* (2013.01); *F01N 3/0231* (2013.01); *F01N 9/00* (2013.01); *F01N 9/002* (2013.01);
(Continued)

(58) Field of Classification Search
CPC .. F01N 3/023; F01N 9/002; F01N 2900/0412; F01N 3/0871; F01N 3/0885
See application file for complete search history.

(56) References Cited

U.S. PATENT DOCUMENTS

| 7,263,825 B1 | 9/2007 | Wills et al. |
| 7,322,185 B2 | 1/2008 | Koga et al. |

(Continued)

FOREIGN PATENT DOCUMENTS

| DE | 10307457 A1 * | 9/2004 | ........... F01N 3/0828 |
| WO | WO-2013/135717 A1 | 9/2013 | |

OTHER PUBLICATIONS

Machine translation of DE 10307457 Al, accessed Oct. 15, 2018.*

*Primary Examiner* — Jonathan R Matthias
(74) *Attorney, Agent, or Firm* — Foley & Lardner LLP

(57) ABSTRACT

A system includes an exhaust aftertreatment system operatively coupled to an engine. The exhaust aftertreatment system includes an exhaust aftertreatment component. A flow sensor is structured to provide an exhaust flow rate value of exhaust gas exiting the engine. A temperature sensor is structured to provide an exhaust temperature value of the exhaust gas proximate the exhaust aftertreatment component. A controller includes an exhaust conditions circuit structured to interpret the exhaust flow rate value via operative communication with each of the flow sensor, and to interpret the exhaust temperature value via operative communication with the temperature sensor. A regeneration time circuit is structured to determine a regeneration time value based on each of the exhaust flow rate value and the exhaust temperature value via a regeneration time lookup table. A regeneration control circuit is structured to control regeneration of the exhaust aftertreatment component based on the regeneration time value.

15 Claims, 4 Drawing Sheets

Related U.S. Application Data

(60) Provisional application No. 62/245,642, filed on Oct. 23, 2015.

(52) U.S. Cl.
CPC ...... *F01N 2260/04* (2013.01); *F01N 2560/06* (2013.01); *F01N 2560/07* (2013.01); *F01N 2560/08* (2013.01); *F01N 2900/0412* (2013.01); *F01N 2900/1404* (2013.01); *F01N 2900/1411* (2013.01); *F01N 2900/1606* (2013.01); *Y02T 10/47* (2013.01)

(56) References Cited

U.S. PATENT DOCUMENTS

| | | |
|---|---|---|
| 7,343,738 B2 | 3/2008 | Tsutsumoto et al. |
| 7,587,892 B2 | 9/2009 | Dye et al. |
| 8,281,574 B2 | 10/2012 | Yamada et al. |
| 8,839,608 B2 | 9/2014 | Chazal |
| 2010/0300075 A1 | 12/2010 | Gonze et al. |
| 2013/0152551 A1 | 6/2013 | Kotnish |

\* cited by examiner

AFTERTREATMENT REGENERATION WITH VARIABLE TIME AND TEMPERATURE

CROSS-REFERENCE TO RELATED APPLICATIONS

This application is a continuation of U.S. patent application Ser. No. 15/299,999, filed on Oct. 21, 2016, which claims priority to U.S. Provisional Patent Application No. 62/245,642, filed on Oct. 23, 2015, the contents of which are incorporated herein by reference in their entirety and for all purposes.

TECHNICAL FIELD

The present disclosure relates generally to exhaust aftertreatment systems and methods.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Generally, emission requirements vary according to engine type. Emission tests for compression-ignition (diesel) engines typically monitor the release of diesel particulate matter (PM), nitrogen oxides ($NO_x$), and unburned hydrocarbons (UHC).

Conventional exhaust gas aftertreatment systems include any of several different components to reduce the levels of harmful exhaust emissions present in exhaust gas. For example, certain exhaust aftertreatment systems for diesel-powered IC engines include various components, such as a diesel oxidation catalyst (DOC), a selective catalytic reduction (SCR) catalyst, a diesel particulate filter (DPF), an SCR on filter, and/or an ammonia slip catalyst (ASC) (also referred to as an ammonia oxidation catalyst (AMOX)). Each of the DOC, SCR catalyst, DPF, SCR on filter, and/or the ASC components are configured to perform a particular exhaust emissions treatment operation on the exhaust gas passing through or over the respective components.

SUMMARY

Various embodiments relate to a system including an exhaust aftertreatment system operatively coupled to an engine. The exhaust aftertreatment system includes an exhaust aftertreatment component. A flow sensor is structured to provide an exhaust flow rate value of exhaust gas exiting the engine. A temperature sensor is structured to provide an exhaust temperature value of the exhaust gas proximate the exhaust aftertreatment component. A controller is in operative communication with each of the exhaust aftertreatment system, the flow sensor, and the temperature sensor. The controller includes an exhaust conditions circuit structured to interpret the exhaust flow rate value via operative communication with the flow sensor, and to interpret the exhaust temperature value via operative communication with the temperature sensor. A regeneration time circuit is structured to determine a regeneration time value based on each of the exhaust flow rate value and the exhaust temperature value via a regeneration time lookup table. A regeneration control circuit is operatively and communicably coupled to each of the exhaust aftertreatment system and the regeneration time circuit. The regeneration control circuit is structured to control regeneration of the exhaust aftertreatment component based on the regeneration time value.

Various other embodiments relate to a method of controlling regeneration of an exhaust aftertreatment component. An example method includes determining an exhaust flow rate value of exhaust gas exiting an engine via operative communication with a flow sensor. An exhaust temperature value of the exhaust gas proximate an exhaust aftertreatment component is determined via operative communication with a temperature sensor. A regeneration time value is determined based on each of the exhaust flow rate value and the exhaust temperature value via a regeneration time lookup table. Regeneration of the exhaust aftertreatment component is controlled based on the regeneration time value.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

Figure 1:
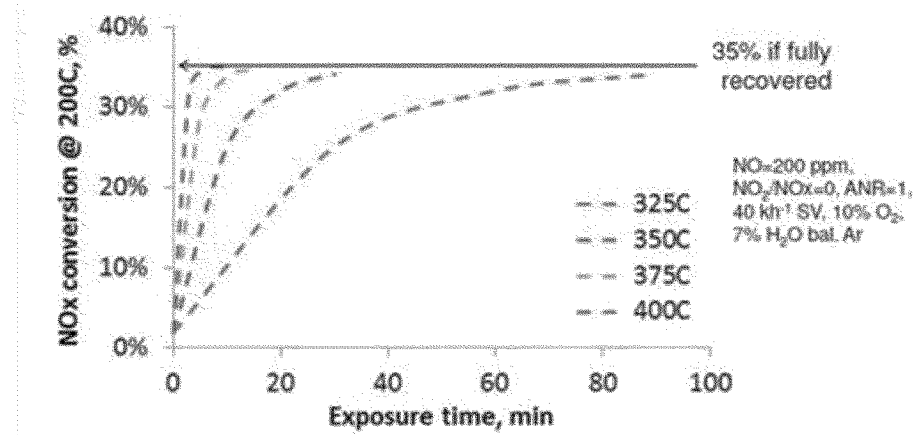
FIG. 1 is a chart illustrating $NO_x$ conversion performance as a function of exposure time for various regeneration temperatures, according to an embodiment.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatus, and systems for controlling regeneration of an exhaust aftertreatment component based on variable time and temperature. The various concepts introduced above and discussed in greater detail below may be implemented in any of numerous ways, as the described concepts are not limited to any particular manner of implementation. Examples of specific implementations and applications are provided primarily for illustrative purposes.

Certain exhaust aftertreatment components (e.g., DPFs) may include a substrate comprising a porous ceramic matrix with parallel passageways through which exhaust gas passes. Particulate matter subsequently accumulates on the surface of the substrate, creating a buildup which must eventually be removed to prevent obstruction of the exhaust gas flow. Common forms of particulate matter are ash and soot. Ash, typically a residue of burnt engine oil, is substantially incombustible and builds slowly within the filter. Soot, chiefly composed of carbon, results from incomplete combustion of fuel and generally comprises a large percentage of particulate matter buildup. Various conditions, such as engine operating conditions, mileage, driving style, terrain, etc., can affect the rate at which particulate matter accumulates within a diesel particulate filter.

Accumulation of particulate matter can cause backpressure within the exhaust system. Excessive backpressure on the engine can degrade engine performance (e.g., lower power and efficiency), and in some cases may result in engine stall. Particulate matter, in general, oxidizes in the presence of nitric oxides (particularly $NO_2$) at modest temperatures, or in the presence of oxygen at higher temperatures. If too much particulate matter has accumulated when oxidation begins, the oxidation rate may get high enough to cause an uncontrolled temperature excursion. The resulting heat can destroy the filter and damage surrounding components. Furthermore, recovery or replacement of the aftertreatment component can be an expensive process.

To prevent potentially hazardous situations, accumulated particulate matter is commonly oxidized and removed in a controlled regeneration process before excessive levels have accumulated. For oxidation of the accumulated particulate matter, exhaust gas temperatures generally must exceed the temperatures typically reached at the filter inlet. Various control strategies may be used to initiate regeneration of an exhaust aftertreatment component. In one control strategy, a reactant, such as diesel fuel, is introduced into an exhaust aftertreatment system to increase the temperature of the aftertreatment component so as to initiate oxidation of particulate buildup. A regeneration event occurs when substantial amounts of soot are consumed on the substrate of the aftertreatment component.

A controlled regeneration can be initiated by the engine's control system when a predetermined amount of particulate matter has accumulated on the substrate, when a predetermined time of engine operation has passed, or when the vehicle has driven a predetermined number of miles. Oxidation from oxygen ($O_2$) generally occurs on the filter at temperatures above about 500 degrees centigrade (° C.), while oxidation from $NO_2$, sometimes referred to herein as noxidation, generally occurs at temperatures between about 300° C. and 500° C. Controlled or active regeneration typically consists of driving the aftertreatment component temperature up to an oxidation temperature level for a predetermined time period such that oxidation of soot accumulated on the substrate takes place.

The temperature of the aftertreatment component is dependent upon the temperature of the exhaust gas entering the aftertreatment component. Accordingly, the temperature of the exhaust gas must be carefully managed to ensure that a desired aftertreatment component inlet exhaust gas temperature is accurately and efficiently reached and maintained for a desired duration to achieve a controlled regeneration event that produces desired results. Conventional systems use various strategies for managing the aftertreatment component inlet exhaust gas temperature. For example, some systems use a combination of internal and external fuel dosing strategies. Each strategy is designed to produce excess UHC in the exhaust gas stream prior to entering the aftertreatment component. The aftertreatment component induces an exothermic oxidation reaction of the UHC, which causes the temperature of the exhaust gas to increase. The amount of UHC added to the exhaust gas is controlled to achieve the desired temperature increase or target controlled regeneration temperature.

FIG. 1 is a chart illustrating $NO_x$ conversion performance as a function of exposure time for various regeneration temperatures, according to an example embodiment. As shown in FIG. 1, the time required for $NO_x$ conversion varies based on regeneration temperature. Incomplete or ineffective regeneration can result in regeneration diagnostic fault codes, and can result in degraded engine performance. FIG. 1 also illustrates that complete regeneration may be achieved at different temperatures. As illustrated in FIG. 1, regeneration is completed faster at higher temperatures. However, complete regeneration may also be achieved at lower temperatures. For example, an exhaust aftertreatment system may control regeneration based on a target temperature of 400° C. However, regeneration will also occur at temperatures below 400° C., although at a slower rate.

The present disclosure relates to a system structured to control regeneration of exhaust aftertreatment components using variable times and temperatures. The system is structured to control regeneration time based on measured exhaust flow rate and temperature. More specifically, the system determines a regeneration time value from a regeneration time lookup table, which includes a plurality of regeneration time values, each being defined based on exhaust flow rate and exhaust temperature values. The system is structured to continue a regeneration event for an exhaust aftertreatment component for a an amount of time specified by the regeneration time value based on exhaust flow rate and temperature proximate the exhaust aftertreatment component in order to determine that the regeneration is successful. By controlling regeneration based on the plurality of regeneration time values, defined based on exhaust flow rate and temperature, the instant system accounts for regeneration that occurs at temperatures below a conventional regeneration target temperature, so long as the regeneration event is operating to clean deposits in a decomposition reactor tube and/or decomposition mixer and/or soot in an exhaust aftertreatment component.

Various embodiments solve technical problems relating to regeneration of exhaust aftertreatment components. Some conventional exhaust aftertreatment systems control regeneration based on maintaining a temperature of an exhaust aftertreatment component (e.g., an inlet exhaust gas temperature) at a target temperature value for a predetermined amount of time. In some systems, the amount of time is varied based on certain factors, such as the amount of particulate matter deposited on the aftertreatment component (e.g., as indicated by a differential pressure measurement). However, one problem with some conventional aftertreatment systems is that the systems will falsely identify a regeneration event as being unsuccessful if the temperature of the aftertreatment component is not maintained at the target temperature for the predetermined amount of time. Some conventional systems fail to take into account regeneration that takes place below the target temperature. Therefore, some conventional systems may falsely identify regeneration events as being unsuccessful even if they are actually successful. In real-world operation, it is difficult to precisely control aftertreatment component temperatures. Accordingly, various embodiments provide improved aftertreatment component regeneration, while avoiding false positives of unsuccessful regeneration events, by more accurately controlling regeneration time based on exhaust flow rate and temperature proximate the aftertreatment component.

Figure 2:
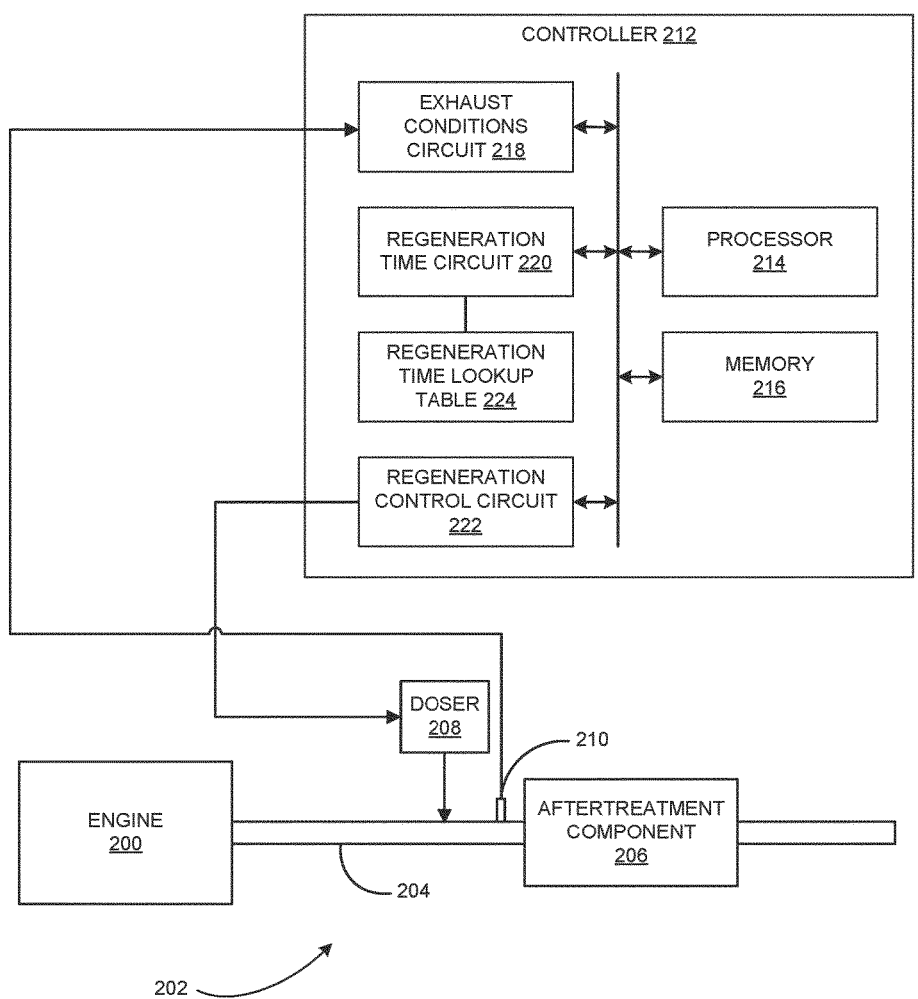
FIG. 2 is a block diagram illustrating an engine and an exhaust aftertreatment system, according to an example embodiment.

FIG. 2 is a block diagram illustrating an engine 200 and an exhaust aftertreatment system 202 fluidly coupled to an exhaust manifold (not shown) of the engine 200, according to an embodiment. The engine 200 can be a compression-ignited or a spark-ignited engine, and can be powered by any of various fuels, such as diesel, natural gas, gasoline, etc. In operation, the engine 200 expels exhaust gas, which flows downstream from the engine 200 through the exhaust aftertreatment system 202. Generally, the exhaust aftertreatment system 202 is configured to remove various chemical and particulate emissions present in the exhaust gas.

The exhaust aftertreatment system 202 includes an exhaust pipe 204, an aftertreatment component 206, a reactant doser 208, sensors 210, and a controller 212. The exhaust pipe 204 is fluidly coupled to the engine 200 so as to receive exhaust gas from the engine 200.

The aftertreatment component 206 is fluidly coupled to the exhaust pipe 204 so as to receive and treat exhaust gas from the engine 200. According to various embodiments, the aftertreatment component 206 may be any of a DOC, SCR catalyst, DPF, SCR on filter, ASC, or other type of aftertreatment component. In some embodiments, the exhaust aftertreatment system 202 includes a plurality of aftertreatment components 206.

The reactant doser 208 is operatively coupled to the exhaust pipe 204 upstream of the aftertreatment component 206. The reactant doser 208 is structured to controllably inject a reactant (e.g., diesel fuel) into the exhaust pipe 204 upstream of the aftertreatment component 206. The reactant combusts upon being injected into the exhaust pipe 204, thereby raising the temperature of the aftertreatment component 206 so as to initiate regeneration of the aftertreatment component 206. Some embodiments do not include the reactant doser 208, but instead initiate regeneration in other ways. For example, some embodiments initiate regeneration via in-cylinder dosing, and other embodiments initiate regeneration using a heater.

The sensors 210 are operatively coupled to at least one of the exhaust pipe and the aftertreatment component 206. The sensors 210 may include, for example, a flow sensor structured to provide an exhaust flow rate value of exhaust gas exiting the engine 200 and/or entering the aftertreatment component 206, a temperature sensor structured to provide an exhaust temperature value of exhaust gas proximate the aftertreatment component 206, a differential pressure sensor structured to provide a pressure differential value of a pressure differential across the aftertreatment component 206, and/or other sensors.

The controller 212 is operatively and communicatively coupled to at least one of the aftertreatment component 206, the reactant doser 208, and the sensors 210. The controller 212 is structured to control regeneration of the aftertreatment component 206.

According to various embodiments, the controller 212 includes a processor 214, such as a microprocessor, an application-specific integrated circuit (ASIC), a field-programmable gate array (FPGA), etc., or combinations thereof. The controller 212 may include memory 216 which may include, but is not limited to, electronic, optical, magnetic, or any other storage or transmission device capable of providing a processor, ASIC, FPGA, etc. with program instructions. The memory 216 may include a memory chip, Electrically Erasable Programmable Read-Only Memory (EEPROM), erasable programmable read only memory (EPROM), flash memory, or any other suitable memory from which the controller 212 can read instructions. The instructions may include code from any suitable programming language. The controller 212 may be configured to control other components of the exhaust aftertreatment system 202 and/or the engine 200 or other components associated with the exhaust aftertreatment system 202. For instance, the controller 212 may be configured to control regeneration of the aftertreatment component 206.

The controller 212 also includes an exhaust conditions circuit 218, a regeneration time circuit 220, and a regeneration control circuit 222. The exhaust conditions circuit 218 is structured to interpret the exhaust flow rate value via operative communication with the sensors 210 (e.g., a flow sensor), and to interpret the exhaust temperature value via operative communication with the sensors 210 (e.g., a temperature sensor). The regeneration time circuit 220 is structured to determine a regeneration time based on each of the exhaust flow rate value and the exhaust temperature value via a regeneration time lookup table 224. The regeneration control circuit 222 is operatively and communicably coupled to each of the exhaust aftertreatment system 202 and the regeneration time circuit 220. The regeneration control circuit 222 is structured to control an output relating to regeneration of the exhaust aftertreatment component based on the regeneration time. In some embodiments, the regeneration control circuit 222 is structured to control dosing from the reactant doser 208. However, in other embodiments, the regeneration control circuit is structured to control engine parameters, an exhaust heater, or other mechanisms for controlling regeneration.

In some embodiments, the regeneration control circuit 222 is structured to maintain regeneration of the aftertreatment component 206 for an amount of time indicated by the regeneration time value. However, in other embodiments, the regeneration control circuit 222 is structured to dynamically control regeneration time of the aftertreatment component 206 by dynamically adjusting the regeneration time value based on subsequent exhaust temperature and flow rate measurements.

Figure 3:
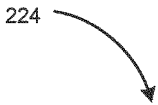
FIG. 3 is an example of the regeneration time lookup table of FIG. 2.

FIG. 3 is an example of the regeneration time lookup table 224 of FIG. 2. As illustrated in FIG. 3, the regeneration time lookup table 224 defines regeneration time parameters for various exhaust flow rates and temperatures. The regeneration parameters are defined based on a transfer function that was developed regarding $NO_x$ conversion performance recovery of a fouled (e.g., coke masked) aftertreatment component (e.g., vanadia SCR catalyst). As shown in FIG. 3, the various regeneration time parameters t1-t9 vary based on exhaust temperature and flow rate. More specifically, the table includes exhaust temperature (X-axis) and engine out flow (Y-axis) as input conditions, and time (e.g., counter) on the Z-axis as an output. The counter defines the regeneration time necessary to complete a successful regeneration event.

Figure 4:
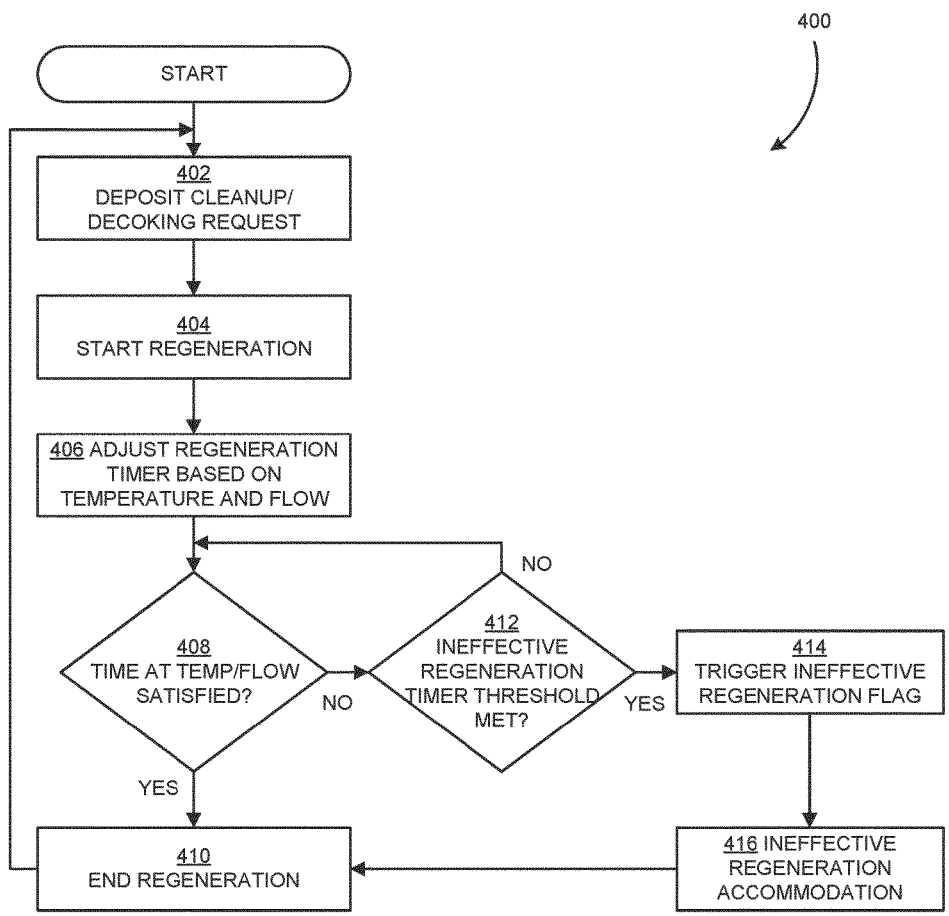
FIG. 4 is a flow diagram of a method of controlling a regeneration event, according to an example embodiment.

FIG. 4 is a flow diagram of a method 400 of controlling a regeneration event, according to an embodiment. At 402, a regeneration (e.g., deposit cleanup or decoking) request is received, and at 404, regeneration is started. According to various embodiments, regeneration is started by raising temperature of exhaust gas proximate an exhaust aftertreatment component. The temperature of the exhaust gas may be raised by controlling engine parameters, hydrocarbon dosing, an exhaust heater, etc.

At 406, a regeneration timer is adjusted based on measured exhaust temperature and exhaust flow (e.g., via the regeneration time lookup table 224 of FIG. 2). At 408, it is determined whether the time at temperature and flow is satisfied. The time at temperature and flow is satisfied (at 408) if a duration of time since regeneration was started (at 404) is greater than or equal to the time specified by the regeneration timer (at 406). In some embodiments, a single target regeneration time value is selected. However, in other embodiments, a target regeneration time is dynamically adjusted as regeneration is being performed.

If the answer to 408 is "YES," regeneration is ended at 410. If the answer to 408 is "NO," it is determined at 412 whether an ineffective regeneration timer threshold is met. The ineffective regeneration timer may define a maximum regeneration time, after which regeneration is deemed to be ineffective. If the answer to 412 is "NO," then regeneration continues until the time at temperature and flow is satisfied at 408. If the answer to 412 is "YES," then an ineffective regeneration flag is triggered at 414 and, at 416, an ineffective regeneration accommodation is made. Regeneration is then ended at 410.

In certain implementations, the systems or processes described herein can include a controller structured to perform certain operations described herein. In certain implementations, the controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium.

In certain implementations, the controller includes one or more circuits structured to functionally execute the operations of the controller. The description herein including circuits emphasizes the structural independence of the aspects of the controller, and illustrates one grouping of operations and responsibilities of the controller. Other groupings that execute similar overall operations are understood within the scope of the present application. Circuits may be implemented in hardware and/or as computer instructions on a non-transient computer readable storage medium, and circuits may be distributed across various hardware or computer based components. More specific descriptions of certain embodiments of controller operations are included in the section referencing FIGS. 1-5.

Example and non-limiting circuit implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the circuit specification, any actuator including at least an electrical, hydraulic, or pneumatic actuator, a solenoid, an op-amp, analog control elements (springs, filters, integrators, adders, dividers, gain elements), and/or digital control elements.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

It should be understood by those of skill in the art who review this disclosure that various features are described and claimed without restricting the scope of these features to the precise numerical ranges provided unless otherwise noted. Accordingly, insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. It should be understood that features described in one embodiment could also be incorporated and/or combined with features from another embodiment in manner understood by those of ordinary skill in the art. It should also be noted that the term "example" as used herein to describe various embodiments are intended to indicate that such embodiments are possible examples, representations, and/or illustrations of possible embodiments (and such terms are not intended to connote that such embodiments are necessarily extraordinary or superlative examples).

What is claimed is:
1. A system, comprising:
an exhaust aftertreatment system operatively coupled to an engine, the exhaust aftertreatment system including an exhaust aftertreatment component;

a flow sensor structured to provide an exhaust flow rate value of exhaust gas through the exhaust aftertreatment system;

a temperature sensor structured to provide an exhaust temperature value of the exhaust gas proximate the exhaust aftertreatment component; and a controller in operative communication with each of the exhaust aftertreatment system, the flow sensor, and the temperature sensor, the controller comprising:

an exhaust conditions circuit structured to interpret the exhaust flow rate value via operative communication with the flow sensor, and to interpret the exhaust temperature value via operative communication with the temperature sensor, a regeneration time circuit structured to determine a regeneration time value based on each of the exhaust flow rate value and the exhaust temperature value via a regeneration time lookup table, the regeneration time lookup table including a plurality of regeneration time values, each of the plurality of regeneration time values relating to a regeneration time required for nitrogen oxide conversion by the exhaust aftertreatment component to reach a predetermined nitrogen oxide conversion value for a particular exhaust flow rate value and exhaust temperature value, wherein the exhaust flow rate value is a first exhaust flow rate value, the exhaust temperature value is a first exhaust temperature value, and the regeneration time value is a first regeneration time value, wherein the exhaust conditions circuit is further structured to interpret a second exhaust flow rate value via operative communication with the flow sensor, and to interpret a second exhaust temperature value via operative communication with the temperature sensor, wherein the regeneration time circuit is further structured to determine a second regeneration time value based on each of the second exhaust flow rate value and the second exhaust temperature value via the regeneration time lookup table, and a regeneration control circuit operatively and communicably coupled to each of the exhaust aftertreatment system and the regeneration time circuit, the regeneration control circuit structured to control regeneration of the exhaust aftertreatment component based on the second regeneration time value.

2. The system of claim 1, wherein regeneration of the exhaust aftertreatment component includes noxidation regeneration.

3. A system, comprising:
an exhaust aftertreatment system operatively coupled to an engine, the exhaust aftertreatment system including an exhaust aftertreatment component;

a flow sensor structured to provide an exhaust flow rate value of exhaust gas through the exhaust aftertreatment system;

a temperature sensor structured to provide an exhaust temperature value of the exhaust gas proximate the exhaust aftertreatment component; and a controller in operative communication with each of the exhaust aftertreatment system, the flow sensor, and the temperature sensor, the controller comprising:

an exhaust conditions circuit structured to interpret the exhaust flow rate value via operative communication with the flow sensor, and to interpret the exhaust temperature value via operative communication with the temperature sensor, a regeneration time circuit structured to determine a regeneration time value based on each of the exhaust flow rate value and the exhaust temperature value via a regeneration time lookup table, the regeneration time lookup table including a plurality of regeneration time values, each of the plurality of regeneration time values relating to a regeneration time required for nitrogen oxide conversion by the exhaust aftertreatment component to reach a predetermined nitrogen oxide conversion value for a particular exhaust flow rate value and exhaust temperature value, and a regeneration control circuit operatively and communicably coupled to each of the exhaust aftertreatment system and the regeneration time circuit, the regeneration control circuit structured to control regeneration of the exhaust aftertreatment component based on the regeneration time value;

a differential pressure sensor structured to provide a differential pressure value indicative of a difference between a first pressure of the exhaust gas upstream of the exhaust aftertreatment component and a second pressure of the exhaust gas downstream of the exhaust aftertreatment component, wherein the exhaust conditions circuit is further structured to interpret the differential pressure value via operative communication with the differential pressure sensor, and wherein the regeneration control circuit is structured to initiate regeneration of the exhaust aftertreatment component if the differential pressure value exceeds a predetermined value.

4. The system of claim 3, wherein initiation of regeneration of the exhaust aftertreatment component comprises dosing reactant fluid upstream of the exhaust aftertreatment component so as to increase temperature of the exhaust gas upstream of the exhaust aftertreatment component.

5. The system of claim 4, wherein the regeneration control circuit is structured to maintain regeneration of the exhaust aftertreatment component for an amount of time indicated by the regeneration time value.

6. A method, comprising:
determining an exhaust flow rate value of exhaust gas exiting an engine via operative communication with a flow sensor;

determining an exhaust temperature value of the exhaust gas proximate an exhaust aftertreatment component via operative communication with a temperature sensor;

determining a regeneration time value based on each of the exhaust flow rate value and the exhaust temperature value via a regeneration time lookup table, the regeneration time lookup table including a plurality of regeneration time values, each of the plurality of regeneration time values relating to a regeneration time required for nitrogen oxide conversion by the exhaust aftertreatment component to reach a predetermined nitrogen oxide conversion value for a particular exhaust flow rate value and exhaust temperature value, wherein the exhaust flow rate value is a first exhaust flow rate value, the exhaust temperature value is a first exhaust temperature value, and the regeneration time value is a first regeneration time value, and further comprising:

determining a second exhaust flow rate value via operative communication with the flow sensor:

determining a second exhaust temperature value via operative communication with the temperature sensor;

determining a second regeneration time value based on each of the second exhaust flow rate value and the second exhaust temperature value via the regeneration time lookup table; and dynamically controlling regeneration of the exhaust aftertreatment component based on the second regeneration time value.

7. The method of claim 6, wherein regeneration of the exhaust aftertreatment component includes noxidation regeneration.

8. A method, comprising:

determining an exhaust flow rate value of exhaust gas exiting an engine via operative communication with a flow sensor;

determining an exhaust temperature value of the exhaust gas proximate an exhaust aftertreatment component via operative communication with a temperature sensor;

determining a regeneration time value based on each of the exhaust flow rate value and the exhaust temperature value via a regeneration time lookup table, the regeneration time lookup table including a plurality of regeneration time values, each of the plurality of regeneration time values relating to a regeneration time required for nitrogen oxide conversion by the exhaust aftertreatment component to reach a predetermined nitrogen oxide conversion value for a particular exhaust flow rate value and exhaust temperature value;

controlling regeneration of the exhaust aftertreatment component based on the regeneration time value;

determining, via operative communication with a differential pressure sensor, a differential pressure value indicative of a difference between a first pressure of the exhaust gas upstream of the exhaust aftertreatment component and a second pressure of the exhaust gas downstream of the exhaust aftertreatment component; and initiating regeneration of the exhaust aftertreatment component if the differential pressure value exceeds a predetermined value.

9. The method of claim 8, wherein initiation of regeneration of the exhaust aftertreatment component comprises dosing reactant fluid upstream of the exhaust aftertreatment component so as to increase temperature of the exhaust gas upstream of the exhaust aftertreatment component.

10. The method of claim 9, further comprising maintaining regeneration of the exhaust aftertreatment component for an amount of time indicated by the regeneration time value.

11. A system, comprising:

a controller in operative communication with each of an exhaust aftertreatment system including an exhaust aftertreatment component, a flow sensor, and a temperature sensor, the controller comprising:

an exhaust conditions circuit structured to interpret an exhaust flow rate value received from the flow sensor, and to interpret an exhaust temperature value received from the temperature sensor, a regeneration time circuit structured to determine a regeneration time value based on each of the exhaust flow rate value and the exhaust temperature value via a regeneration time lookup table, the regeneration time lookup table including a plurality of regeneration time values, each of the plurality of regeneration time values relating to a regeneration time required for nitrogen oxide conversion by the exhaust aftertreatment component to reach a predetermined nitrogen oxide conversion value for a particular exhaust flow rate value and exhaust temperature value, wherein the exhaust flow rate value is a first exhaust flow rate value, the exhaust temperature value is a first exhaust temperature value, and the regeneration time value is a first regeneration time value, wherein the exhaust conditions circuit is further structured to interpret a second exhaust flow rate value via operative communication with the flow sensor, and to interpret a second exhaust temperature value via operative communication with the temperature sensor, wherein the regeneration time circuit is further structured to determine a second regeneration time value based on each of the second exhaust flow rate value and the second exhaust temperature value via the regeneration time lookup table, and a regeneration control circuit operatively and communicably coupled to each of the exhaust aftertreatment system and the regeneration time circuit, the regeneration control circuit structured to control regeneration of the exhaust aftertreatment component based on the second regeneration time value.

12. The system of claim 11, wherein regeneration of the exhaust aftertreatment component includes noxidation regeneration.

13. A system, comprising:

a controller in operative communication with each of an exhaust aftertreatment system including an exhaust aftertreatment component, a flow sensor, and a temperature sensor, the controller comprising:

an exhaust conditions circuit structured to interpret an exhaust flow rate value received from the flow sensor, and to interpret an exhaust temperature value received from the temperature sensor, a regeneration time circuit structured to determine a regeneration time value based on each of the exhaust flow rate value and the exhaust temperature value via a regeneration time lookup table, the regeneration time lookup table including a plurality of regeneration time values, each of the plurality of regeneration time values relating to a regeneration time required for nitrogen oxide conversion by the exhaust aftertreatment component to reach a predetermined nitrogen oxide conversion value for a particular exhaust flow rate value and exhaust temperature value, and a regeneration control circuit operatively and communicably coupled to each of the exhaust aftertreatment system and the regeneration time circuit, the regeneration control circuit structured to control regeneration of the exhaust aftertreatment component based on the regeneration time value, wherein the exhaust conditions circuit is further structured to interpret a differential pressure value received from a differential pressure sensor, the differential pressure value indicative of a difference between a first pressure of the exhaust gas upstream of the exhaust aftertreatment component and a second pressure of the exhaust gas downstream of the exhaust aftertreatment component, and wherein the regeneration control circuit is structured to initiate regeneration of the exhaust aftertreatment component if the differential pressure value exceeds a predetermined value.

14. The system of claim 13, wherein initiation of regeneration of the exhaust aftertreatment component comprises dosing reactant fluid upstream of the exhaust aftertreatment component so as to increase temperature of the exhaust gas upstream of the exhaust aftertreatment component.

15. The system of claim 14, wherein the regeneration control circuit is structured to maintain regeneration of the exhaust aftertreatment component for an amount of time indicated by the regeneration time value.

* * * * *